US008793810B2

(12) United States Patent
Rich et al.

(10) Patent No.: US 8,793,810 B2
(45) Date of Patent: Jul. 29, 2014

(54) SEMICONDUCTOR-BASED DEVICE AUTHENTICATION

(75) Inventors: David Gerard Rich, West Bloomfield, MI (US); Yu William Feng, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 270 days.

(21) Appl. No.: 13/345,803

(22) Filed: Jan. 9, 2012

(65) Prior Publication Data

US 2013/0176104 A1  Jul. 11, 2013

(51) Int. Cl.
G08B 29/00 (2006.01)
(52) U.S. Cl.
USPC .............................. 726/36; 340/5.8
(58) Field of Classification Search
None
See application file for complete search history.

(56) References Cited

U.S. PATENT DOCUMENTS

| 6,665,803 | B2 | 12/2003 | Lunsford et al. |
|---|---|---|---|
| 7,565,458 | B2 | 7/2009 | Thijssen et al. |
| 7,619,386 | B2 | 11/2009 | Sasaki et al. |
| 7,996,697 | B2 | 8/2011 | Hsieh |
| 2005/0050325 | A1 | 3/2005 | Ohkubo |
| 2006/0076924 | A1 | 4/2006 | Kim et al. |
| 2006/0208850 | A1 | 9/2006 | Ikeuchi et al. |
| 2007/0143864 | A1 | 6/2007 | Cabana et al. |
| 2007/0170888 | A1 | 7/2007 | Hioki |
| 2007/0260892 | A1 * | 11/2007 | Paul et al. .................. 713/193 |
| 2008/0309313 | A1 * | 12/2008 | Farrar et al. ................ 323/351 |
| 2009/0001932 | A1 | 1/2009 | Kamijo et al. |
| 2010/0197367 | A1 | 8/2010 | Pattenden et al. |

FOREIGN PATENT DOCUMENTS

| CA | 2798467 A1 | 7/2013 |
|---|---|---|
| EP | 1667306 A1 * | 6/2006 |
| EP | 1 974 415 B1 | 11/2009 |
| EP | 2613421 A1 | 7/2013 |

OTHER PUBLICATIONS

Extended European Search Report on corresponding EP application No. 12150497.1, dated Apr. 23, 2012.
Response to extended European Search Report on corresponding EP application No. 12150497.1, dated Jun. 27, 2012.
European Examination Report on corresponding EP application No. 12 150 497.1 dated Apr. 26, 2013.
Response filed in corresponding European Patent Application No. 12150497.1 dated Aug. 22, 2013.

* cited by examiner

*Primary Examiner* — Andrew Nalven
*Assistant Examiner* — Christopher Ruprecht
(74) *Attorney, Agent, or Firm* — Fish & Richardson P.C.

(57) ABSTRACT

Various embodiments of devices and associated methods are described herein for authenticating electrical devices. In one aspect, an electrical device is provided comprising an interface configured to receive and transmit signals; a power line coupled to the interface and configured to provide a power signal thereto; and an authentication circuit coupled to the interface and the power line. The authentication circuit is configured to disable the power signal on the power line for a specified time period in response to an authentication request signal received at the interface and to provide an authentication response signal on the power line to represent the disabling of the power signal.

21 Claims, 8 Drawing Sheets

US 8,793,810 B2

SEMICONDUCTOR-BASED DEVICE AUTHENTICATION

FIELD

The various embodiments described herein generally relate to devices and methods for the authentication of electrical devices.

BACKGROUND

Counterfeit electrical devices, also known as knock-off or copycat devices, are prevalent in today's society and are problematic. Not only do counterfeit devices result in economic loss for the rightful manufacturers of these products, but consumers are also at risk since counterfeit devices may not work as well as the authentic devices and may also be harmful to the user. For example, counterfeit batteries or counterfeit power packs have several concerns since these counterfeit electrical devices typically have fewer safety features and are generally of poor quality, such that these counterfeit batteries or power packs may start a fire or explode when used in certain conditions. Traditional anti-counterfeiting methods, such as using a secure label, Ultraviolet (UV) text or holograms may not be effective because these marking techniques can be easily copied. In addition, regular consumers may not know to look for these marking techniques in order to determine whether an electrical device is an authentic device or is a counterfeit device.

BRIEF DESCRIPTION OF THE DRAWINGS

For a better understanding of the various embodiments described herein, and to show more clearly how these various embodiments may be carried into effect, reference will now be made, by way of example, to the accompanying drawings which show at least one example embodiment, and in which.

DETAILED DESCRIPTION OF THE EMBODIMENTS

Figure 1:
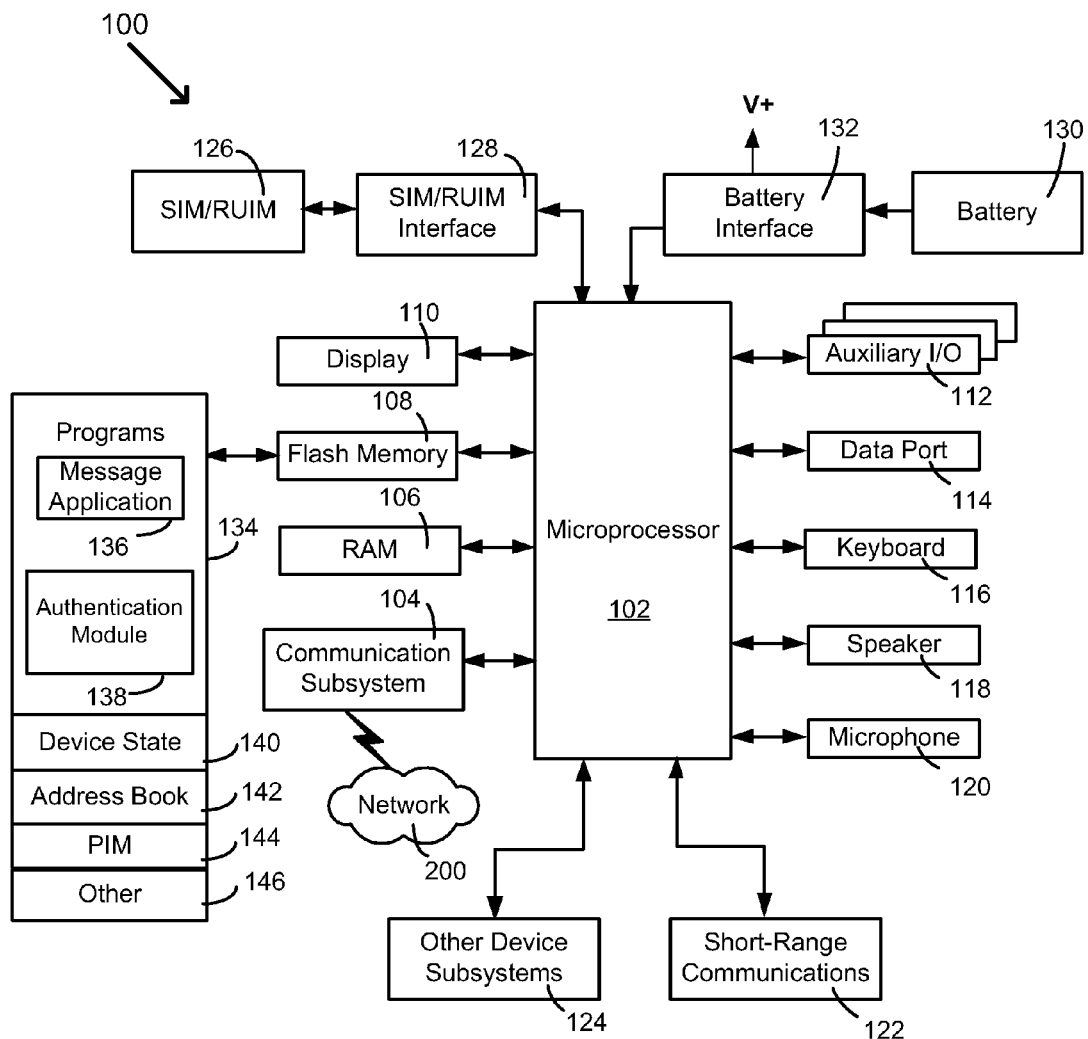
FIG. 1 is a block diagram of one example of a mobile device.

Various apparatuses or processes will be described below to provide example embodiments of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to devices, circuits and software as well as associated methods that are used for device authentication. In particular, the embodiments described herein relate to the use of protection circuitry to also provide an authentication function. It should be noted that the term authentication is meant to cover situations in which a device is checked to make sure that it is authentic and not a counterfeit device. It should be noted that this process can also be referred to as identification. Furthermore, it should be noted that the term "coupled" as used herein indicates that two elements can be directly coupled to one another or can be coupled to one another through one or more intermediate elements. It should also be noted that the term "battery module" is meant to cover battery modules with single battery cells, power packs that contain multiple battery cells and smart batteries as well as the elements that protect the cells, enable charging/discharging of the cells and the like. It should also be noted that the term "battery module" is meant to cover battery modules using different cell chemistries as well as batteries using different energy harvesting techniques, such as thermal, electromechanical, wireless charging and solar.

To aid the reader in understanding the structure of a mobile device that can perform authentication through one or more techniques described herein, reference will be made to FIG. 1. The mobile device can use one of the authentication methods described herein to authenticate peripheral devices or replaceable modules that are used in conjunction with the mobile device. However, it should be understood that the embodiments described herein are not limited to a mobile device but can be extended to an authentication device that performs authentication on any test device that has an embedded authentication circuit that can disable of manipulate a power signal provided or used by the test device. Examples of electronic devices that can use at least one of the authentication methods described herein generally include any portable electronic device that uses replaceable batteries such as cellular phones, cellular smart-phones, wireless organizers, personal digital assistants, computers, laptops, handheld wireless communication devices, wireless enabled notebook computers, tablet computers or e-readers, electronic security devices, wireless Internet appliances and the like. The electronic devices listed herein which are mobile are generally portable and thus are battery-powered. While some of these devices include wireless communication capability, others can be standalone devices that do not communicate with other devices.

Referring now to FIG. 1, shown therein is a block diagram of one example of a mobile device 100. The mobile device 100 comprises a number of components, the controlling component being a microprocessor 102, which controls the overall operation of the mobile device 100. Communication functions, including data and voice communications, are performed through a communication subsystem 104. The communication subsystem 104 receives messages from and sends messages to a wireless network 200. In this example, the communication subsystem 104 is configured in accordance with the Global System for Mobile Communication (GSM) and General Packet Radio Services (GPRS) standards. In other embodiments, the communication subsystem 104 can be configured in accordance with other communication standards as described below. New standards are still being defined, but it is believed that they will have similarities to the network behaviour described herein, and it will also be understood by persons skilled in the art that the various embodiments described herein should be able to be adapted to work with any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit-switched voice communications and packet-switched data communications.

Although the wireless network 200 associated with the mobile device 100 is a GSM/GPRS wireless network in this example, the mobile device 100 can be adapted to use other wireless networks in variant embodiments. For example, the different types of wireless networks that can be employed include, but are not limited to, data-centric wireless networks, voice-centric wireless networks, and dual-mode networks that can support both voice and data communications over the same physical base stations. Examples of networks also include, but are not limited to, Code Division Multiple Access (CDMA), CDMA2000 networks, GSM/GPRS networks, 3G networks like EDGE, W-CDMA and UMTS, 4G/LTE networks and future technologies such as 5G networks. Some other examples of data-centric networks include WiFi 802.11, Mobitex™ and DataTAC™ network communication systems. Examples of voice-centric data networks include Personal Communication Systems (PCS) networks like GSM and Time Division Multiple Access (TDMA) systems. Examples of communication protocols/standards that the mobile device 100 can be adapted to be used with include, but are not limited to, 3GPP and 3GPP2, High-Speed Packet Access (HSPA) standards such as High-Speed Downlink Packet Access (HSDPA), 3GPP LTE, LTE, LTE Advanced, WiMax, and Flash-OFDM.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the microprocessor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after network registration or activation procedures have been completed. Network access is associated with a subscriber or user of the mobile device 100. To identify a subscriber, the mobile device 100 may use a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the mobile device 100 and to personalize the mobile device 100, among other things. Without the SIM/RUIM card 126, the mobile device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, SMS, and MMS. More advanced services can include: point of sale, field service and sales force automation. The SIM/RUIM card 126 includes a processor and memory for storing information. Once the SIM card card/126 is inserted into the SIM/RUIM interface 128, it is coupled to the microprocessor 102. In order to identify the subscriber, the SIM/RUIM card 126 contains some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The mobile device 100 is a battery-powered device and includes a battery interface 132 and uses one or more rechargeable batteries in a battery module 130. The battery interface 132 is coupled to a regulator (not shown), which assists the battery module 130 in providing power V+ to the mobile device 100. Alternatively, the battery module 130 can be a smart battery as is known in the art. Smart batteries generally include a battery processor, battery memory, switching and protection circuitry, measurement circuitry and a battery pack that includes one or more batteries, which are generally rechargeable. In either case, the one or more batteries in the battery module 130 can be made from lithium, nickel-cadmium, lithium-ion, or other suitable composite material.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture. When the microprocessor 102 is executing any of the software applications 134, the microprocessor 102 can be considered to be configured to execute a number of steps according to the methods specified by the code of the software applications 134.

The software applications 134 include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages can be stored remotely from the device 100 such as in a data store of an associated host system that the mobile device 100 communicates with. For instance, in some cases, only recent messages can be stored within the device 100 while the older messages can be stored in a remote location such as the data store associated with a message server. This can occur when the internal memory of the device 100 is full or when messages have reached a certain "age", i.e. messages older than 3 months can be stored at a remote location. In an alternative embodiment, all messages can be stored in a remote location while only recent messages can be stored on the mobile device 100.

The mobile device 100 further includes an authentication module 138, a device state module 140, an address book 142, a Personal Information Manager (PIM) 144, and other modules 146. The authentication module 138 is used to authenticate a module that can be inserted into the module device 100 or a peripheral device that is attached to the mobile device 100. The operation of the authentication module 138 is discussed in further detail below with regards to FIGS. 2 to 6. In general, the authentication module 138 sends an authentication request signal to a test device (i.e. a module or peripheral device) that is being authenticated. The authentication module 138 then compares an authentication response signal from the test device to an expected authentication response that is stored in the memory elements 106 or 108 to determine if the test device is an authentic device. The authentication module 138 can use at least one of a power-based authentication technique and a cryptographic-based technique.

The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book 142, the information can include the name, phone number, work address and email address of the contact, among other information. The other modules 146 can include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

The mobile device 100 functions with modules or peripheral devices that can be replaced and/or purchased separately from the mobile device 100. As such, the possibility exists that a user of the mobile device 100 may unknowingly purchase a module, such as a battery module, or a peripheral device, such as a battery charger, than is not authentic but is counterfeit. It may be dangerous to operate the mobile device 100 with counterfeit modules or peripheral devices since these modules or devices may be of poor quality, may not function as intended and may actually damage the mobile device 100 during operation. Accordingly, the mobile device 100 is provided with at least one authentication technique in order to determine whether a test device (i.e. a replaceable module or a peripheral device) that is used by the mobile device 100 is authentic. The mobile device 100 generally employs power-based authentication techniques, described herein, which probe for a certain power response or power signature from the test device. As such, the authentication methods described herein works with test devices that have an internal power source or are connected to an external power source and have an authentication circuit which is used to alter a power signal after receiving an authentication request signal from the mobile device 100. In some embodiments, the power-based authentication techniques described herein can also be combined with standard cryptographic authentication techniques, as described below, at least with respect to FIGS. 5 and 6, in order to provide improved security.

The advantages of using a power-based authentication technique is that authentication can be made with slight modification to the existing battery-protection IC or battery-protection FETs. Thus, if desired, battery modules do not need to be made which have a separate cryptographic IC which reduces cost, and decreases production complexity. However, there can also be embodiments for battery modules which use both a battery-protection IC that provides power-based authentication as well as a cryptographic IC that provides cryptographic-based authentication. There can also be other embodiments in which a battery-protection IC can provide power-based authentication and/or cryptographic-based authentication. Such battery modules can be authenticated using either one of these two alternative authentication methods which increases flexibility. Alternatively, in some cases, such battery modules can be authenticated using both authentication methods which should improve security. In addition, the authentication circuit or the authentication method employed with the authentication circuit can be updated every few months in order to make it difficult for counterfeiters to replicate the authentication circuit or the authentication method. Furthermore, the authentication circuit is difficult to observe by users of devices that incorporate the authentication circuit thereby discouraging copying, but by application of certain authentication request signals, the response of the authentication circuit can be received and verified. It is also difficult for counterfeiters to keep up with changing authentication keys or power profiles as they typically do not have access to semiconductor fabrication facilities. In addition, unlike traditional authentication methods that use cryptographic ICs, in accordance with the various techniques and circuitry described herein, the response is embedded (hidden) in the power signal rather than the communication signal, which makes it difficult to observe and makes it difficult for counterfeiters to differentiate between authentication events and protection/power events. Furthermore, the power-based authentication modules can be employed in future models of electrical devices meaning that counterfeiters would have to duplicate the silicon-based implementation and routing in their entirety to cover the future models as well as the progression of the implementation of the authentication methods described herein.

The power-based authentication methods described herein can also be used with a stand-alone authentication device, one of the main purposes of which is to authenticate test devices. For example, there can be a shipment of test devices that are tested at a checkpoint, such as a border crossing, for authenticity. In this case, the test devices can be designed to utilize one of the power-based authentication circuits described herein and the authentication device can utilize one of the power-based authentication methods described herein to authenticate the test devices.

Figure 2:
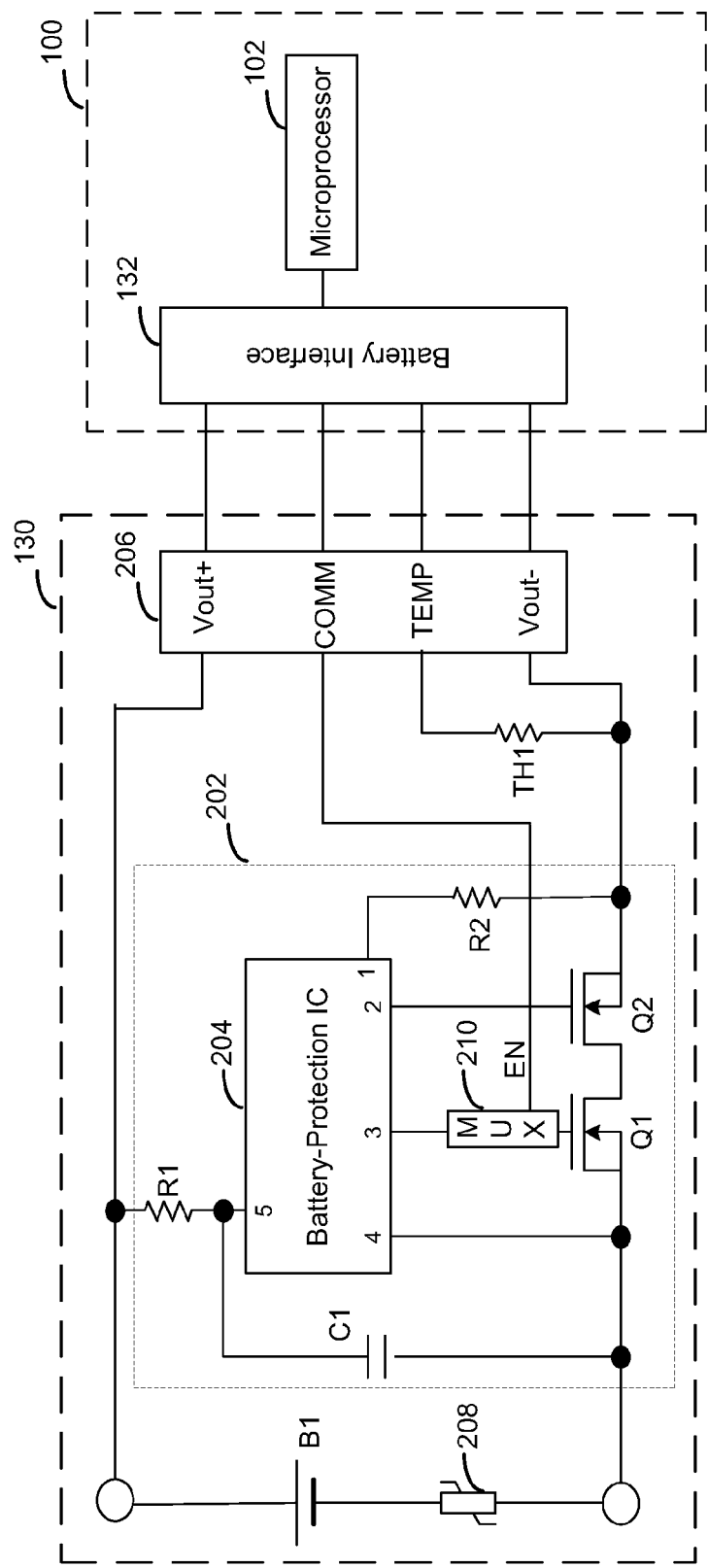
FIG. 2 is a block diagram of a portion of the mobile device of FIG. 1 and an example embodiment of a battery module.

Referring now to FIG. 2, shown therein is a block diagram of a portion of the mobile device 100, which acts as an authentication device, and an example embodiment of the battery module 130, which acts as a test device that will be authenticated. The battery module 130 comprises an authentication circuit 202, an interface 206, a secondary protection circuit 208, a battery cell B1 and a thermistor TH1. The authentication circuit 202 comprises a battery-protection IC 204, a multiplexer (MUX) 210, a discharge transistor Q1, a charge transistor Q2, resistors R1 and R2, and a capacitor C1. It should be noted that in other embodiments, there can be several battery cells in a parallel or series connection in place of the battery cell B1.

The interface 206 is configured to receive and transmit signals between the battery module 130 and a device that is coupled to the battery module 130, which in this case is the mobile device 100. The battery module 130 also includes a power line that is coupled to the interface 206 and is configured to provide a power signal thereto. In this example, the power line comprises the wired connection between the battery B1 and the positive voltage terminal Vout+ on the interface 206 as well as the wired connection from the secondary protection circuit 208, through the transistors Q1 and Q2 of the authentication circuit 202, to the negative voltage terminal Vout− on the interface 206. The battery cell B1 is configured to generate the power signal.

The battery-protection IC 204, in conjunction with other electrical components of the authentication circuit 202 and the battery module 130, is utilized to protect the battery cell B1 from any adverse electrical conditions such as over charge, over discharge, over current and the like. The battery-protection IC 204 is also used to control the charging and discharging of the battery B1. The battery-protection IC 204 can include a microcontroller (not shown) to aid in providing these functions. The battery-protection IC 204 is coupled to the battery cell B1 via the resistor R1 and the capacitor C1. The battery-protection IC 204 is also coupled to the interface 206 via a series connection with the resistor R1 and a series connection with the resistor R2.

To provide battery-protection, a first node of the secondary protection circuit 208 is connected to a first node of the battery B1 and the battery-protection IC 204 is coupled to a second node of the battery B1 by a series connection with the resistor R1. The battery-protection IC 204 is also coupled to a second node of the protection circuit 208 by a series connection with the capacitor C1. The resistor R1 and the capacitor C1 are connected in parallel at a pin of the battery-protection IC 204. The resistor R1 is used for ESD protection and to reduce power fluctuations by limiting current and providing a filtering action in conjunction with the capacitor C1. The value of the resistor R1 can vary from about 150Ω to about 1 kΩ and the value of the capacitor C1 can vary from about 0.068 μF to about 1 μF, for example. The secondary protection circuit 208 is used to provide over-temperature and over-current protection for the battery cell B1 in order to limit the current if the battery cell B1 is exposed to high temperatures. The secondary protection circuit 208 can be implemented using different components or circuits depending on exact requirements for the battery module 130, as is known by those skilled in the art. For example, the secondary protection circuit 208 can be implemented using a Positive Temperature Coefficient (PTC) device or a thermal breaker.

The battery-protection IC 204 controls the discharging and charging of the battery B1 through the discharge transistor Q1 and the charge transistor Q2, respectively. The battery-protection IC 204 is coupled to the discharge transistor Q1 to enable the power signal on the power line at the interface 206. In particular, the discharge transistor Q1 allows the battery cell B1 to provide a power signal to the mobile device 130 through the Vout+ and Vout− terminals of the interface 130. The battery-protection IC 204 is also coupled to the charge transistor Q2 to allow the battery cell B1 to be recharged. During charge or discharge, the battery-protection IC 204 provides a high voltage signal (i.e. high logic value) to the discharge transistor Q1 and a high voltage signal to the charge transistor Q2. The discharge transistor Q1 and the charge transistor Q2 can both be implemented using Field Effect Transistors (FETs). However, other transistors can also be used as is known by those skilled in the art in other embodiments. In some cases, the transistors Q1 and Q2 can be implemented using the same IC package or co-packaged with protection IC or even integrated with protection IC.

The thermistor TH1 is used to provide temperature information regarding the temperature of the battery cell B1. A first node of the thermistor TH1 is coupled to the source node of the charge transistor Q2 and the negative voltage pin Vout− of the interface 206. A second node of the thermistor TH1 is coupled to a temperature terminal TEMP of the interface 206. The thermistor TH1 can have a value in the range of about several tens of thousands of Ohms.

The resistor R2 is used to protect against cases in which there is a reverse connection of a charging device to the interface 206. A first node of the resistor R2 is coupled to the battery-protection IC 204 and a second node of the resistor R2 is coupled to the source node of the charge transistor Q2. The resistor R2 can have a value in the range of about several hundred Ohms to several thousand Ohms. The value of the resistor R2 depends on the particular IC that is used as the battery-protection IC 204.

In addition to providing battery-protection, the authentication circuit 202 is also used to authenticate the battery module 130. In this manner, the authentication circuit 202 can be used to replace a cryptographic IC in devices that require authentication and can manipulate or disable a power signal. In other embodiments, the authentication circuit 202 can be used with a cryptographic IC as is described in further detail below.

The authentication circuit 202 is coupled with a COMM pin on the interface 206 via a communication line which allows the authentication circuit 202 to receive an authentication request signal at the interface 206 from a device that is connected to the battery module 130 and is authenticating the battery module 130, which is the mobile device 100 in this example embodiment. In response to the authentication request signal, the authentication circuit 202 is configured to disable the power signal on the power line for a specified time period and to provide an authentication response signal on the power line to represent the disabling of the power signal.

In particular, in the example embodiment of FIG. 2, the authentication circuit 202 comprises the MUX 210 which is coupled to the battery-protection IC 204, the interface 206 via the COMM pin, and the gate of the discharge transistor Q1. The MUX 210 receives the authentication request signal via the COMM pin and is configured to turn off the discharge transistor Q1 in response to the authentication request signal in order to disconnect the battery cell B1 for a specified time period thereby disabling the power signal which in effect provides a power response signal on the Vout+ and Vout− pins, which in this case is a lack of power or voltage.

During normal operation, the input EN to the MUX 210 is maintained at a low voltage level or low logic level by the microprocessor 102 of the mobile device 100. At this time, the battery-protection IC 204, the discharge transistor Q1 and the charge transistor Q2 assume their typical behavior. During authentication, the microprocessor 102 sends an authentication request signal to the authentication circuit 202 by raising the voltage of the input EN for a specific time period. The input to the discharge transistor Q1 is then pulled low for the time period regardless of the signal provided by the battery-protection IC 204 to the MUX 210. This then effectively disables the power signal, provided by the battery cell B1, and power is not provided across the Vout+ and Vout− pins, thereby generating a power response signal (which in effect is the lack of power) from the authentication circuit 202. This behavior assumes that the battery module 130 is authentic. If the battery module 130 is counterfeit, then it will not respond in this manner, and there will be no power loss during authentication.

The mobile device 100 may or may not have backup power during the power loss that occurs during a valid authentication. If the mobile device 100 has backup power, then the mobile device 100 will remain on during this event and the power loss (i.e. power response signal) from the battery module 130 will be detected by the mobile device 100. The power response signal can then be compared with an expected power response to determine if the battery module 130 is an authentic device; in effect the authentication result can be recorded as a PASS or a FAIL. The mobile device 100 will have backup power if it is coupled to a charging device or it has an internal back up battery or super capacitor, when the mobile device 100 is performing a successful authentication of the battery module 130 (in which the power signal from the battery cell B1 is disabled).

If the mobile device 100 does not have a backup power source during authentication, then the mobile device 100 will reset (i.e. restart) when authenticating a genuine battery module 130 since the power signal is disabled in response to the authentication request signal. In this case the authentication response signal would be a lack of a power signal which results in the reset of the mobile device 100. In the event that the smart battery 130 is counterfeit, the mobile device 100 will fail to reset during authentication of the battery module 130. Non-volatile memory 108 on the mobile device 100 can be used to remember the device state of the mobile device 100 before the reset occurs.

The authentication process can be done when the mobile device 100 is first connected with a replaceable module or a peripheral device to ensure the authenticity of these elements. The authentication of these replaceable modules or peripheral devices can also optionally be done on each power up of the mobile device 100 to defeat hackers from doing hot swap attacks.

The authentication process can also be done while the device is in use. For example, when the user is installing a new application on the mobile device 100, the user may be prompted to reset the mobile device 100. Just before the mobile device 100 resets, the mobile device 100 can authenticate at least one replaceable module or peripheral device that is being used with the mobile device 100. If the authentication is successful, the application is successfully installed and the mobile device 100 resets. If the authentication is not successful, then the user can be notified that they are using a counterfeit element (e.g. a battery module, a peripheral device and the like as the case may be).

It should also be noted that the authentication processes described herein can be applied to alternative embodiments which utilize different types of protection circuitry and circuits that can manipulate a power signal at the test device. For example, there can be embodiments which utilize individual or single protection transistors.

Figure 3:
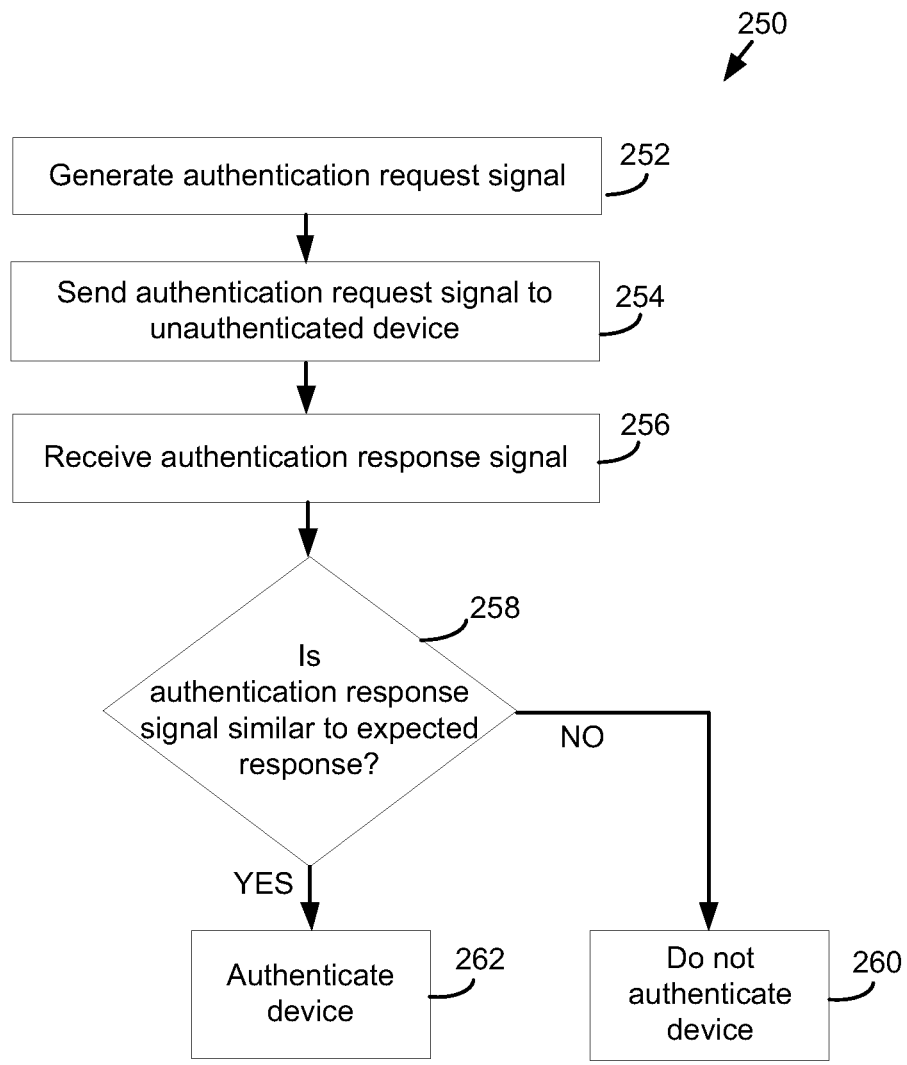
FIG. 3 is a flowchart of an example embodiment of a method that can be used by the mobile device to authenticate the battery module.

Referring now to FIG. 3, shown therein is a flowchart of an example embodiment of an authentication method 250 that can be used by the mobile device 100 to authenticate a test device (which may also be called an unauthenticated device) such as the battery module 130, another replaceable module or a peripheral device, such as a smartphone docking station or docking keyboard. The authentication method 250 can be performed by the microprocessor 102 when the software code of the authentication module 138 is being executed. Since the mobile device 100 is performing the authentication method 250, the mobile device 100 can also be referred to as an authentication device.

At step 252, an authentication request signal is generated at the mobile device 100. In this example embodiment, the authentication request signal can be a voltage level that is raised high for a specific period of time. In other embodiments, the authentication request signal can have different forms, such as a digital sequence, as will be seen with respect to other embodiments described herein. However, in general, the authentication request signal encodes a period of time for which the power signal at the test device is to be manipulated by the test device.

At step 254, the authentication request signal is sent to the test device, which in this example is the battery module 130. The authentication request signal is transmitted from the battery interface 132 to the interface 206 and is received by the MUX 210 of the authentication circuit 202. In other embodiments, the authentication request signal can be received by other components of the authentication circuit 202. In response to the authentication request signal, the test device generates an authentication response signal by manipulating a power signal that is sensed by the mobile device 100.

At step 256, the mobile device 100 receives the authentication response signal. The authentication response signal is transmitted from the test device to the mobile device 100 through the interface 206 and the battery interface 132.

At step 258, the authentication response signal is checked to see if it is similar to an expected authentication response in order to authenticate the test device. As previously described, the expected authentication response represents a disabling of the power signal by the test device which may result in different events depending on whether the mobile device 100 is coupled to a backup power source during authentication. For example, if the mobile device 100 is coupled to a backup power source during authentication, then the expected authentication response can be a disabling or other manipulation of the power signal from the test device for a certain period of time that matches the period of time specified in the authentication request signal. In cases where the mobile device 100 is not coupled to a backup power source during authentication, then the expected authentication response can be a reset of the mobile device 100.

If the authentication response signal is not similar to the expected authentication response, then the method 250 goes to step 260 and the test device is not authenticated. In this case, a warning can be provided to the user of the mobile device 100 via the display 110 that the mobile device 100 is being used with a counterfeit I device and appropriate action should be taken. For instance, if the counterfeit device is a battery module, then the mobile device 100 may be operated in a limited fashion until the battery module is replaced. The limited operation can be, but is not limited to, operating in a safe temperature range, a safe power range, only allowing emergency calls, and the like. In other embodiments, the mobile device 100 may be shut down until the counterfeit device is replaced.

If the authentication response signal is similar to the expected authentication response, then the method 250 goes to step 262 and the test device is authenticated. The mobile device 100 can then operate as it normally would.

Figure 4:
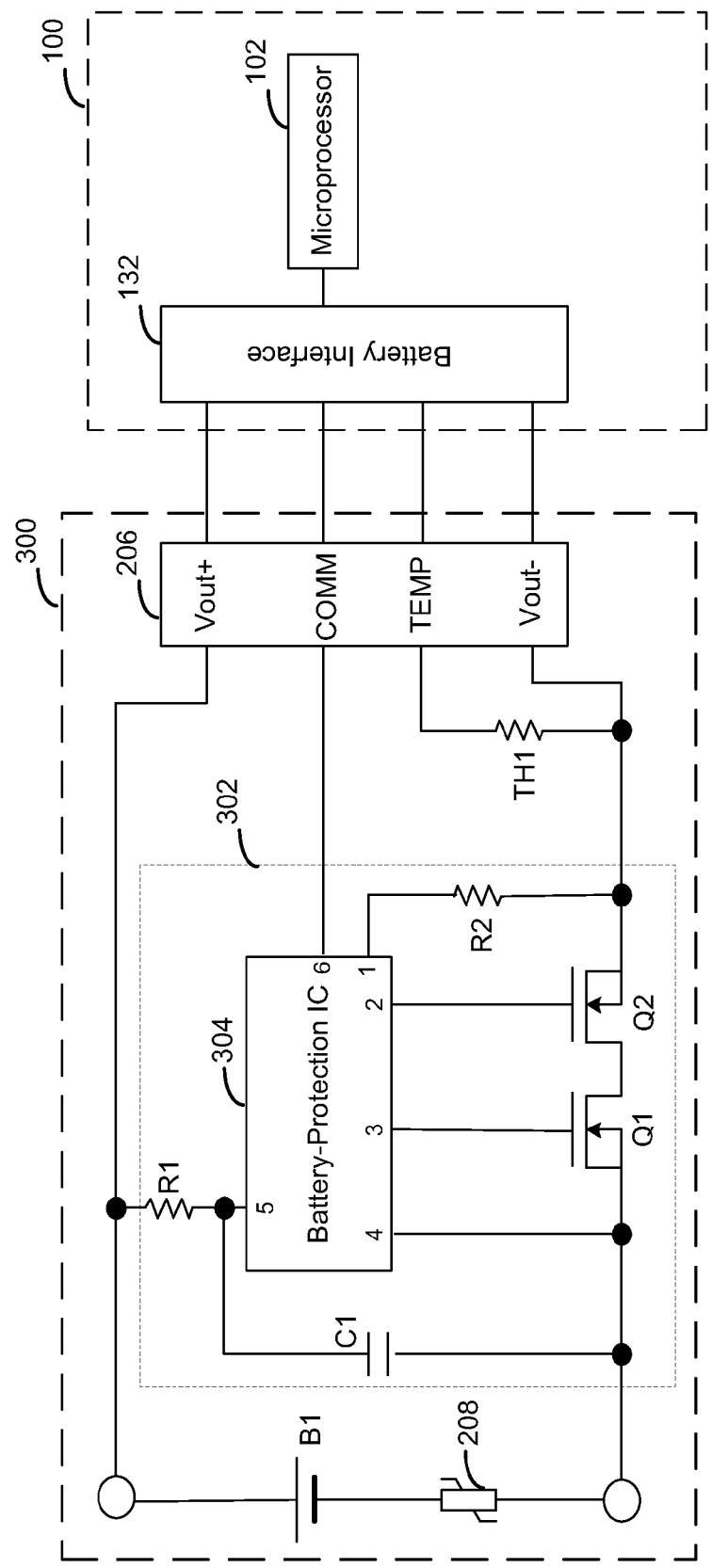
FIG. 4 is a block diagram of a portion of the mobile device of FIG. 1 and another example embodiment of a battery module.

Referring now to FIG. 4, shown therein is a block diagram of a portion of the mobile device 100 and another example embodiment of a battery module 300. The battery module 300 comprises an authentication circuit 302 that allows for power-based authentication. The battery module 300 has similar components and operates in a similar manner as the battery module 130 with regards to power-based authentication. However, the authentication circuit 302 does not utilize the MUX 210. While the battery-protection IC 304 is still coupled to the battery cell B1 and Vout+ and Vout− pins of the interface 206, the battery-protection IC 304 also has an input pin that is coupled to the COMM pin on the battery interface 206 via a communication line which allows the battery-protection IC 304 to receive the authentication request signal from the mobile device 100. The communication line can transmit analog or digital signals. Furthermore, the battery-protection IC 304 is more directly coupled to the discharge transistor Q1 so that the battery-protection IC 304 can turn off the discharge transistor Q1 to disconnect the battery cell B1 for a specified time period in response to the authentication request signal during authentication. Authentication of the battery module 130 can be performed as was described for the battery module 130 and the authentication method 250.

In addition, unlike the case for the battery module 130, the use of a communication line in the battery module 300 allows the mobile device 100 to send the authentication request signal as a digital signal (i.e. a sequence of 0s and 1s) or an analog signal (at a certain voltage level). This provides the mobile device 100 with the flexibility of performing a cryptographic-based authentication method using a cryptographic algorithm, cryptographic keys and cryptographic challenges and responses as is known by those skilled in the art. Accordingly, in an alternative embodiment, the battery-protection IC 304 can be used to implement both power-based authentication and cryptographic-based authentication. For example, the microprocessor 102 can send a specific digital signal to the battery-protection IC 304 as a cryptographic challenge. The battery-protection IC 304 then processes the cryptographic challenge using a cryptographic algorithm and a key to generate another specific digital signal as a cryptographic response. The battery-protection IC 304 sends the cryptographic response to the mobile device 100 through the interface 206 and the battery interface 132. The microprocessor 102 then compares the cryptographic response with an expected cryptographic response. If there is a match then the battery module 300 is authenticated. If there is not a match, then the battery module 300 is deemed to be a counterfeit. Accordingly, the battery-protection IC 304 can be configured to generate a cryptographic response as the authentication response signal in a first mode of operation and the battery-protection IC 304 can be configured to turn off the discharge transistor Q1 to disconnect the battery cell B1 for the specified time period to provide the authentication response signal in a second mode of operation. In some embodiments, both the power-based authentication and cryptographic authentication methods can be used together to provide increased security since the battery module 300 must pass both authentication methods in order to be authenticated. However, there can also be other embodiments in which either one of the authentication methods can be used to authenticate the battery module 300. The use of these different embodiments would depend on the level of security needed, which allows for more flexibility for authentication. In addition, battery-protection IC protection limits need to be trimmed at the last stage of manufacturing, which makes changing the authentication key or functions easy and inexpensive as part of the trimming process. Furthermore, with the battery module 300, the battery-protection IC 304 can directly communicate with the microprocessor 102 to form a security network such that specific interactions between these two elements can provide an extra layer of interdependent authentication.

Figure 5:
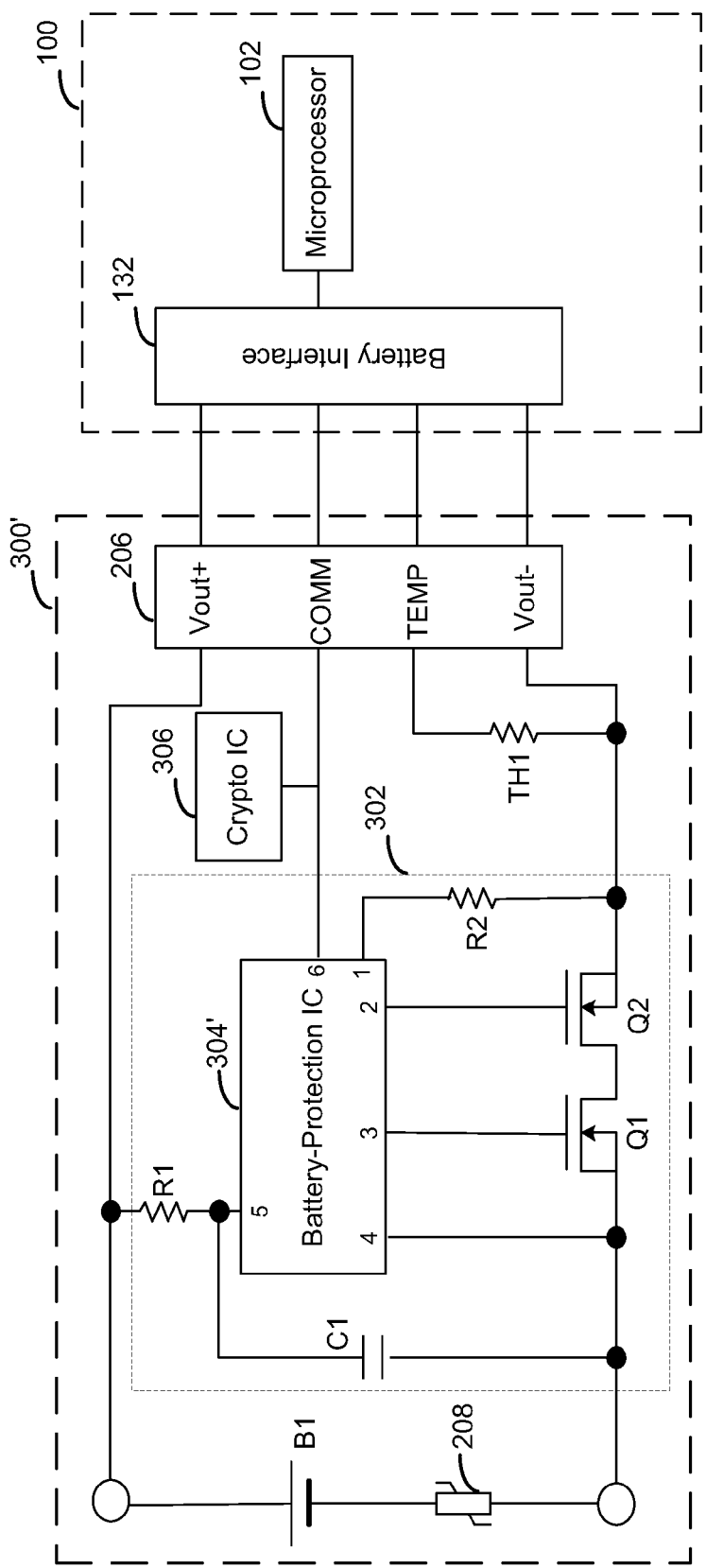
FIG. 5 is a block diagram of a portion of the mobile device of FIG. 1 and another example embodiment of a battery module.

Referring now to FIG. 5, shown therein is a block diagram of a portion of the mobile device 100 and another example embodiment of a battery module 300'. The battery module 300' is similar to the battery module 300 except that the battery module 300' also comprises a cryptographic IC 306 which generates a cryptographic response when provided with a cryptographic challenge as the authentication request signal (as described previously for the cryptographic operation of the battery-protection IC 304). Accordingly, in this case, the battery-protection IC 304' does not have to provide a cryptographic function as can be done with the battery-protection IC 304. This embodiment is advantageous as the cryptographic IC 306 provides redundancy with respect to the authentication of the battery module 300' in the event that the power-based authentication technique cannot be used for authentication for whatever reason. Furthermore, this embodiment also allows for authentication which uses both power-based authentication and cryptographic based authentication to authenticate the battery module 130 as described previously.

Figure 6:
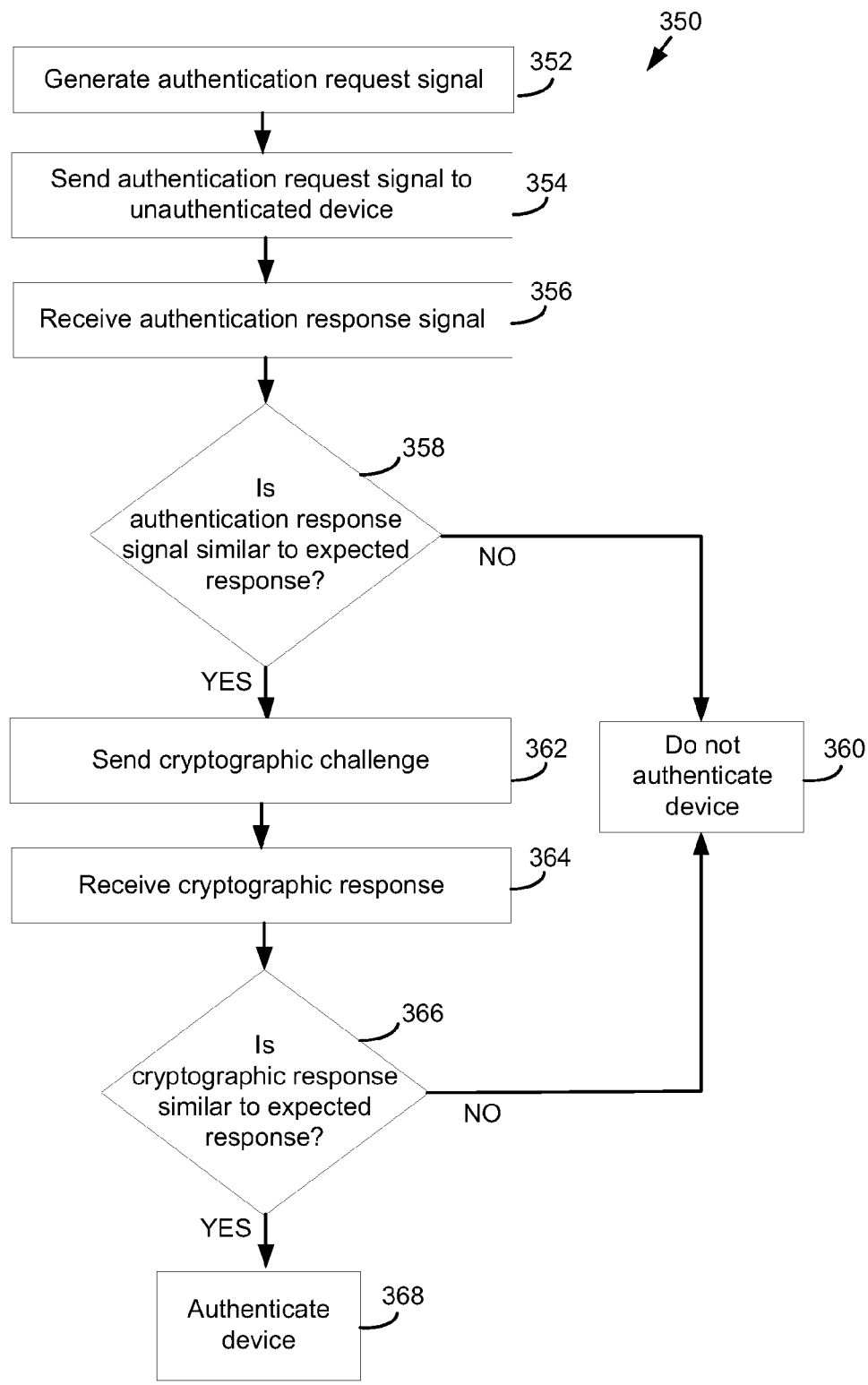
FIG. 6 is a flowchart of another example embodiment of a method that can be used by the mobile device to authenticate the battery module.

Referring now to FIG. 6, shown therein is a flowchart of an example embodiment of another authentication method 350 that can be used by the mobile device 100 to authenticate the battery module 300 or 300'. The authentication method 350 is a two-stage authentication technique which combines power-based authentication with cryptographic-based authentication. While the authentication method 350 first performs power-based authentication and then performs cryptographic-based authentication, in alternative embodiments, cryptographic-based authentication can be performed before power-based authentication.

Steps 352 to 360 of the authentication method 350 are similar to steps 252 to 260 of the authentication method 250. If power-based authentication is successful at step 358 then the authentication method 350 goes on to conduct cryptographic-based authentication unlike the authentication method 250 which would indicate a successful authentication at this point.

At step 362, a cryptographic challenge is sent to the battery module 300 or 300' via the battery interface 132 and the interface 206. The battery-protection IC 304 or the cryptographic IC 306, depending on the embodiment of the battery module, would then generate a cryptographic response based on the cryptographic challenge, a cryptographic algorithm and potentially a key. It should be noted that other types of cryptographic techniques can potentially be used as is known by those skilled in the art.

At step 364, the cryptographic response is received by the microprocessor 102 via the interface 206 and the battery interface 132. At step 366, the microprocessor 102 checks to see if the cryptographic response is similar to an expected cryptographic response, which can be stored in one of the memory elements 108 or 106 of the mobile device 100. If the cryptographic response is not similar to the expected cryptographic response, then the authentication method 350 proceeds to step 360 at which point the test device is not authenticated. If the cryptographic response is similar to the expected cryptographic response, then the authentication method 350 proceeds to step 368 at which point the test device is authenticated. The authentication method 350 can behave similarly as the authentication method 250 for authenticated and unauthenticated test devices.

It should be noted that while the authentication methods 250 and 350 were described from the point of view of authenticating a battery module, the authentication methods 250 and 350 can be modified to authenticate any test device including any type of replaceable module or peripheral device that are operated with the mobile device 100. However, the test devices have an internal power source that generates a power signal or receive a power signal from an external power source and, in both cases, are able to manipulate or disable the power signal in response to an authentication request signal as described herein for the battery modules 130, 300 and 300'. The test devices can easily be modified to incorporate an authentication circuit as described herein by including at least transistors and a control circuit to be able to receive an authentication request signal and manipulate power signals. Circuitry to provide protection functionality may also be added if desired but can be optional.

It should also be noted that while the authentication methods 250 and 350 were described from the point of view of a mobile device performing the authentication of a battery module, the authentication methods 250 and 350 can be performed by a stand-alone authentication device whose main function is to authenticate test devices as just described. For example, the authentication device can be used to authenticate test devices at a checkpoint such as a border crossing provided that the test devices have an internal power source that generates a power signal or receive a power signal from an external power source and are able to manipulate or disable the power signal in response to an authentication request signal as described herein for the battery modules 130, 300 and 300'. It is possible to test battery modules in this manner when they are being shipped since there is typically about 30% to 50% of charge in a battery module when it is shipped. Several example embodiments of an authentication device will now be described for the authentication of battery modules. However, as stated above, the authentication device can be used to authenticate other test devices.

Figure 7:
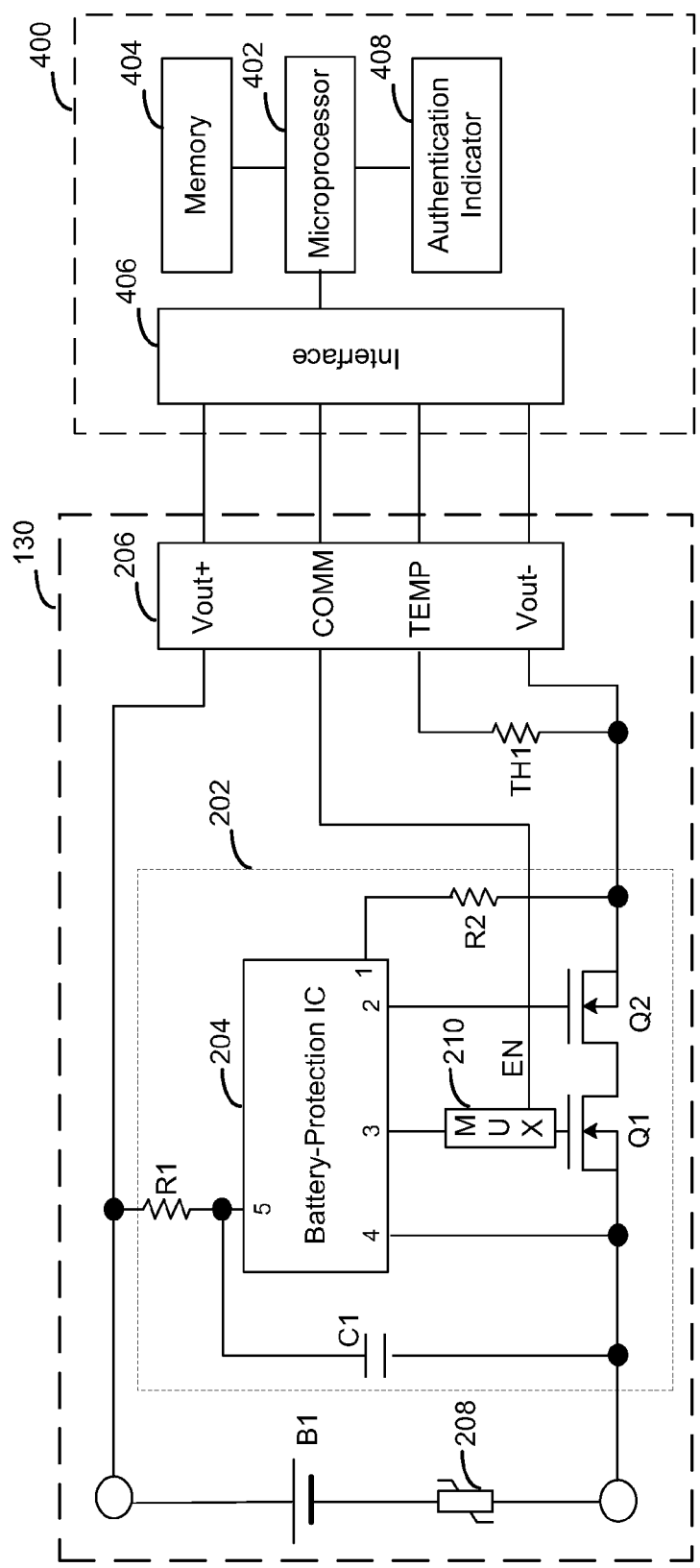
FIG. 7 is a block diagram of an example embodiment of an authentication device and a test device.

Referring now to FIG. 7, shown therein is a block diagram of an example embodiment of an authentication device 400 which can authenticate a test device, which in this case is the battery module 130. The authentication device 400 comprises a microprocessor 402, a memory element 404, an interface 406 and an authentication indicator 408. The authentication device 400 also receives power from an internal power source, such as a battery for example, or an external power source, such as an electrical outlet for example.

The interface 406 is used to couple the authentication device 400 with a test device and allow signals to be transferred therebetween. The memory element 404 can be a combination of temporary and persistent memory such as RAM and flash memory. The memory element stores at least one expected authentication response and parameters for at least one authentication request signal. For instance an expected authentication response for power-based authentication and an expected authentication response for cryptographic-based authentication can be stored in the memory element. In addition, an authentication request signal for power-based authentication and an authentication request (i.e. one or more challenges) for cryptographic-based authentication can be stored in the memory element 404.

While a cryptographic IC is not shown in the battery module 130, in alternative embodiments, the battery module 130 can include a cryptographic IC that is coupled to the COMM pin on the interface 206 to support cryptographic-based authentication.

The microprocessor 402 is coupled to the interface 406 and is configured to control operation of the authentication device 400. The microprocessor 402 is also configured to generate and send an authentication request signal to the battery module 130 via the interface 406 and compare the authentication response signal received from the battery module 130 in response to the authentication request signal with the expected authentication response in order to authenticate the battery module 130. As described before, the expected authentication response represents a disabling or other manipulation of the power signal by an authentication circuit for a certain time period as specified in the authentication request signal.

The authentication indicator 408 is used to indicate the authentication results for the test device. The authentication indicator 408 can be a display, such as an LED display, which shows a graphical or text-based (i.e. "PASS" or "FAIL") authentication result. The authentication indicator 408 can also be an LED or a series of LEDs which visually show the authentication result. For example, the authentication indicator 408 can include red and green LEDs in which case the red LED can be lit if authentication fails and the green LED can be lit if authentication is successful.

The authentication device 400 performs authentication with the battery module 130 in a similar fashion as was described previously with respect to the mobile device 100 and the battery module 130. However, since the authentication device 400 has its own power source or access to an external power source, the memory element 404 can be used to log the authentication result. Furthermore, the authentication device 400 will not reset upon successful authentication as was the case with the mobile device 100 when it performed authentication and was not connected to a charger.

It should be noted that the authentication device 400 can be made rather inexpensively and there can be embodiments in which the interface 406 can be augmented to be connected to many test devices in parallel to authenticate the test devices in parallel.

Figure 8:
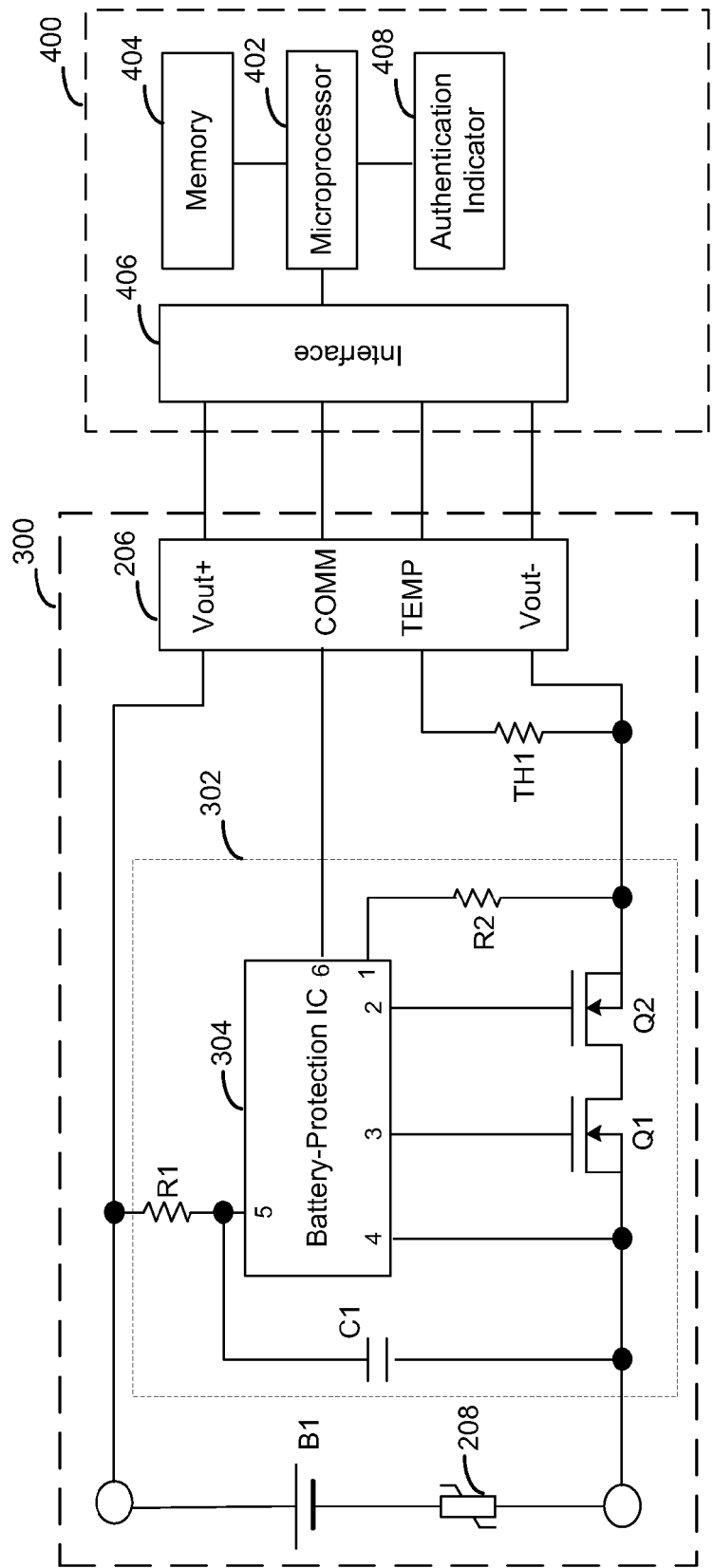
FIG. 8 is a block diagram of the authentication device and another test device.

Referring now to FIG. 8, shown therein is a block diagram of the authentication device 400 that is coupled with the battery module 300 for performing authentication. There can also be embodiments in which the authentication device 400 is connected to the battery module 300' for performing authentication. Accordingly, the authentication device 400 can perform either of the authentication methods 250 and 350 as well as variants thereof.

The operation of the authentication device 400 along with the battery module 300 is similar to that described for the mobile device 100 and the battery module 300. Accordingly, the authentication device 400 is also capable of performing at least one of power-based authentication and cryptographic-based authentication. To perform cryptographic-based authentication, the memory element 404 comprises at least one cryptographic challenge and corresponding expected cryptographic response. The microprocessor 402 is configured to send one cryptographic challenge to the test device via the interfaces 406 and 206, and to compare a resulting cryptographic response from the test device with the expected cryptographic response stored in the memory element 404 in order to authenticate the test device. The microprocessor 402 can also be configured to perform a two-stage authentication test by testing if the test device can disable the power signal in response to an authentication request signal and testing if the test device can provide a correct cryptographic response in response to at least one cryptographic challenge.

As mentioned previously, when performing power-based authentication, since the authentication device 400 has its own power source or access to an external power source, the memory element 404 can be used to log the authentication result which can also be identified via the authentication indicator 408. Furthermore, the authentication device 400 will not reset upon successful authentication as was the case with the mobile device 100 when it performed authentication and was not connected to a charger.

It should be noted that the hardware and software as well as characteristics of the signals used for the power-based authentication methods described herein can be updated periodically to make it difficult for counterfeiters to copy and use the authentication circuits to pass off their counterfeit devices as authentic devices. For example, the voltage level used in the authentication request signal can be varied and the authentication circuit modified accordingly either by adding circuit components to work with the different voltage levels or programming the battery-protection IC to recognize the different voltage levels in the authentication request signal. When the authentication request signal is sent as a digital sequence, then different digital sequences can be sent over time and the battery-protection IC can be programmed to recognize the different digital sequences. Also, in some cases, different time periods can be encoded into the authentication request signal so that the authentication circuit in the test device disables or modifies the power signal for different time periods. This updating procedure works well for test devices that have a high turnover and are produced several times throughout the year (say every three months for example). In addition, these updates, which can also referred to as trimming, can be done during the last already existing step of the manufacturing process and therefore these updates do not add any extra cost. Furthermore, equipment used to manufacture the authentication circuits should be difficult or expensive for counterfeiters to obtain which should prevent the copying of the authentication circuits and methods described herein. It will also be difficult for counterfeiters to keep up with changing authentication keys or changing power profiles as they typically do not have access to semiconductor fabrication facilities. In addition, unlike traditional authentication methods using cryptographic IC, the response is embedded in the power signal rather than the communication signal, which makes it difficult for counterfeiters to observe and differentiate between authentication events and protection events. Accordingly, it will be difficult, not cost-effective and time consuming for counterfeiters to attempt to copy the authentication techniques described herein.

It should also be noted that at least some of the elements used to perform at least one of the authentication methods described herein may be implemented via software and may be written in a high-level procedural language such as object oriented programming. Accordingly, the program code may be written in C, C++ or any other suitable programming language and may comprise modules or classes, as is known to those skilled in object oriented programming. Alternatively, in addition thereto, at least some of these elements implemented via software may be written in assembly language, machine language or firmware as needed. In either case, the program code can be stored on a storage media or on a computer readable medium that is readable by a general or special purpose programmable computing device having a processor, an operating system and the associated hardware and software that is necessary to implement the functionality of at least one of the authentication methods described herein. The program code, when read by a processor, configures the processor to operate in a new, specific and predefined manner in order to perform at least one of the authentication methods described herein.

In one aspect, in at least one example embodiment described herein, there is provided an electrical device comprising an interface configured to receive and transmit signals; a power line coupled to the interface and configured to provide a power signal thereto; and an authentication circuit coupled to the interface and the power line, the authentication circuit being configured to disable the power signal on the power line for a specified time period in response to an authentication request signal received at the interface and to provide an authentication response signal on the power line to represent the disabling of the power signal.

In at least some cases, the power signal is provided by an external power source.

Alternatively, in at least some cases, the electrical device comprises at least one battery cell configured to generate the power signal.

In at least some cases, the authentication circuit comprises a battery-protection Integrated Circuit (IC) coupled to the at least one battery cell and the interface, the battery-protection IC configured to receive the authentication request signal; and a discharge transistor coupled to the battery-protection IC and the at least one battery cell. The battery-protection IC is configured to turn off the discharge transistor to disconnect the at least one battery cell for the specified time period in response to the authentication request signal.

In at least some cases, the authentication circuit comprises a battery-protection Integrated Circuit (IC) coupled to the at least one battery cell and the interface; a multiplexer coupled to the battery-protection IC and the interface, the multiplexer being configured to receive the authentication request signal; and a discharge transistor coupled to the battery-protection IC and the at least one battery cell. The discharge transistor is configured to turn off in response to the authentication request signal in order to disconnect the at least one battery cell for the specified time period.

In at least some cases, the electrical device further comprises a cryptographic IC configured to generate a cryptographic response when provided with the authentication request signal.

In at least some cases, the authentication circuit comprises a battery-protection Integrated Circuit (IC) coupled to the at least one battery cell and the interface and a discharge transistor coupled to the battery-protection IC and the at least one battery cell, and, in response to the authentication request signal, the battery-protection IC is configured to generate a cryptographic response as the authentication response signal in a first mode of operation, and the battery-protection IC is configured to turn off the discharge transistor to disconnect the at least one battery cell for the specified time period to provide the authentication response signal in a second mode of operation.

In another aspect, in at least one example embodiment described herein, there is provided an authentication device for authenticating a test device that provides a power signal. The authentication device comprises an interface to couple the authentication device with the test device and allow signals to be transferred therebetween; a memory for storing at least one expected authentication response; and a processor coupled to the interface, the processor being configured to control operation of the authentication device, to generate and send an authentication request signal to the test device via the interface, and to compare an authentication response signal received from the test device via the interface in response to the authentication request signal with an expected authentication response in order to authenticate the test device, the expected authentication response representing a disabling of the power signal by the test device.

In at least some cases, the authentication device further comprises an authentication indicator to indicate authentication results for the test device.

In at least some cases, the memory further comprises at least one cryptographic challenge and corresponding expected cryptographic response, and the processor is configured to send the at least one cryptographic challenge to the test device via the interface, and to compare a resulting cryptographic response from the test device with the expected cryptographic response stored in the memory in order to authenticate the test device.

In at least some cases, the processor is configured to perform a two-stage authentication test by testing if the test device can disable the power signal in response to the authentication request signal and testing if the test device can provide a correct cryptographic response in response to at least one cryptographic challenge.

In another aspect, in at least one example embodiment described herein, there is provided a method of authenticating an electrical device, wherein the method comprises enabling a power signal on a power line at an interface of the electrical device; receiving an authentication request signal at the interface; disabling the power signal on the power line for a specified time period in response to the authentication request signal; and providing an authentication response signal on the power line to represent the disabling of the power signal.

In at least some cases, the method further comprises receiving the authentication request signal at a battery-protection Integrated Circuit (IC) coupled to the power line and the interface; and turning off a discharge transistor coupled to the battery-protection IC and the power line in response to the authentication request signal to disable the power signal on the power line for the specified time period.

In at least some cases, the method further comprises receiving the authentication request signal at a multiplexer coupled to a battery-protection IC and the interface; and turning off a discharge transistor coupled to the battery-protection IC and the power line in response to the authentication request signal to disable the power signal on the power line for the specified time period.

In at least some cases, the method further comprises using a cryptographic Integrated Circuit to generate a cryptographic response when provided with a cryptographic challenge.

In at least some cases, the method further comprises operating a battery-protection Integrated Circuit (IC) coupled to the power line and the interface in first and second modes in response to the authentication request signal, wherein in the first mode the battery-protection IC is configured to generate a cryptographic response as the authentication response signal and in the second mode the battery-protection IC is configured to turn off a discharge transistor to disable the power line for the specified time period to provide the authentication response signal.

In another aspect, in at least one example embodiment described herein, there is provided a method of using an authentication device to authenticate a test device that provides a power signal. The method comprises: storing at least one expected authentication response in a memory of the authentication device; sending an authentication request signal to the test device; comparing an authentication response signal received from the test device in response to the authentication request signal with the expected authentication response representing a disabling of the power signal by the test device; and authenticating the test device if the authentication response signal is similar to the expected authentication response.

In at least some cases, the method further comprises performing a two-stage authentication test by testing if the test device can disable the power signal in response to the authentication request signal and testing if the test device can provide a correct cryptographic response in response to at least one cryptographic challenge.

In another aspect, in at least one example embodiment described herein, there is provided a computer readable medium comprising a plurality of instructions executable on a microprocessor of an electrical device for adapting the microprocessor to implement a method of authenticating the electrical device. The method comprises enabling a power signal on a power line of the electrical device; receiving an authentication request signal; disabling the power signal on the power line for a specified time period in response to the authentication request signal; and providing an authentication response signal on the power line to represent the disabling of the power signal.

In another aspect, in at least one example embodiment described herein, there is provided a computer readable medium comprising a plurality of instructions executable on a microprocessor of an electrical device for adapting the microprocessor to implement a method of authenticating a test device. The method comprises sending an authentication request signal to the test device; comparing an authentication response signal received from the test device in response to the authentication request signal with an expected authentication response representing a disabling of a power signal of the test device; and authenticating the test device if the authentication request signal is similar to the expected authentication response.

It should be understood that various modifications can be made to the embodiments described and illustrated herein, without departing from the embodiments, the general scope of which is defined in the appended claims.

The invention claimed is:

1. An electrical device to be authenticated by an authentication device, the electrical device comprising:
   an interface configured to receive and transmit signals;
   a power line coupled to the interface and configured to provide a power signal thereto; and
   an authentication circuit coupled to the interface and the power line, the authentication circuit being configured to aid in authenticating the electrical device by generating an authentication response signal comprising temporarily disabling the power signal on the power line for a pre-specified time period that is finite upon receipt of an authentication request signal that is received by the interface from the authentication device and sent by the interface to the authentication circuit during authentication of the electrical device to ensure that the electrical device is not a counterfeit device,
   whereby the electrical device is successfully authenticated upon the authentication device detecting a lack of the power signal for the pre-specified time period.

2. The electrical device of claim 1, wherein the power signal is provided by an external power source.

3. The electrical device of claim 1, wherein the electrical device comprises at least one battery cell configured to generate the power signal.

4. The electrical device of claim 3, wherein the authentication circuit comprises:
   a battery-protection Integrated Circuit (IC) coupled to the at least one battery cell and the interface, the battery-protection IC configured to receive the authentication request signal; and
   a discharge transistor coupled to the battery-protection IC and the at least one battery cell,
   wherein the battery-protection IC is configured to turn off the discharge transistor to disconnect the at least one battery cell for the specified time period in response to the authentication request signal.

5. The electrical device of claim 3, wherein the authentication circuit comprises:
   a battery-protection Integrated Circuit (IC) coupled to the at least one battery cell and the interface;
   a multiplexer coupled to the battery-protection IC and the interface, the multiplexer being configured to receive the authentication request signal; and
   a discharge transistor coupled to the battery-protection IC and the at least one battery cell,
   wherein the discharge transistor is configured to turn off in response to the authentication request signal in order to disconnect the at least one battery cell for the specified time period.

6. The electrical device of claim 5, further comprising a cryptographic IC configured to generate a cryptographic response when provided with the authentication request signal.

7. The electrical device of claim 3, wherein the authentication circuit comprises a battery-protection Integrated Circuit (IC) coupled to the at least one battery cell and the interface and a discharge transistor coupled to the battery-protection IC and the at least one battery cell, and, in response to the authentication request signal, the battery-protection IC is configured to generate a cryptographic response as the authentication response signal in a first mode of operation, and the battery-protection IC is configured to turn off the discharge transistor to disconnect the at least one battery cell for the specified time period to provide the authentication response signal in a second mode of operation.

8. An authentication device for authenticating a test device that is to be authenticated and provides a power signal, the authentication device comprising:
   an interface to couple the authentication device with the test device and allow signals to be transferred therebetween;
   a memory for storing at least one expected authentication response, the at least one expected authentication response comprises temporarily disabling the power signal from the test device for a pre-specified time period that is finite; and
   a processor coupled to the interface, the processor being configured to control operation of the authentication device, to generate and send an authentication request signal to the test device via the interface, to receive, via the interface, an authentication response signal from the test device in response to the authentication request signal and to compare the authentication response signal with the expected authentication response in order to determine whether the test device is authentic or counterfeit, the test device being successfully authenticated as being authentic when the authentication response signal is similar to the expected authentication response when the authentication response signal indicates a lack of the power signal for the pre-specified time period.

9. The authentication device of claim 8, further comprising an authentication indicator to indicate authentication results for the test device.

10. The authentication device of claim 8, wherein the memory further comprises at least one cryptographic challenge and corresponding expected cryptographic response, and the processor is configured to send the at least one cryptographic challenge to the test device via the interface, and to compare a resulting cryptographic response from the test device with the expected cryptographic response stored in the memory in order to authenticate the test device.

11. The authentication device of claim 8, wherein the processor is configured to perform a two-stage authentication test by testing if the test device can disable the power signal in response to the authentication request signal and testing if the test device can provide a correct cryptographic response in response to at least one cryptographic challenge.

12. A method of authenticating an electrical device that provides a power signal and is to be authenticated by an authentication device, wherein the method comprises:
- enabling the power signal on a power line at an interface of the electrical device;
- receiving an authentication request signal at the interface from the authentication device;
- generating an authentication response signal comprising temporarily disabling the power signal on the power line for a pre-specified time period that is finite during authentication of the electrical device in response to the authentication request signal; and
- providing the authentication response signal on the power line whereby the electrical device is successfully authenticated upon the authentication device detecting a lack of the power signal for the pre-specified time period.

13. The method of claim 12, wherein the method further comprises:
- receiving the authentication request signal at a battery-protection Integrated Circuit (IC) coupled to the power line and the interface; and
- turning off a discharge transistor coupled to the battery-protection IC and the power line in response to the authentication request signal to disable the power signal on the power line for the specified time period.

14. The method of claim 12, wherein the method further comprises:
- receiving the authentication request signal at a multiplexer coupled to a battery-protection IC and the interface; and
- turning off a discharge transistor coupled to the battery-protection IC and the power line in response to the authentication request signal to disable the power signal on the power line for the specified time period.

15. The method of claim 12, further comprising using a cryptographic Integrated Circuit to generate a cryptographic response when provided with a cryptographic challenge.

16. The method of claim 12, wherein the method further comprises operating a battery-protection Integrated Circuit (IC) coupled to the power line and the interface in first and second modes in response to the authentication request signal, wherein in the first mode the battery-protection IC is configured to generate a cryptographic response as the authentication response signal, and in the second mode the battery-protection IC is configured to turn off a discharge transistor to disable the power line for the specified time period to provide the authentication response signal.

17. The method of claim 12, wherein the specified time period is periodically updated.

18. A method of using an authentication device to authenticate a test device that provides a power signal, the method comprising:
- storing at least one expected authentication response in a memory of the authentication device, the at least one expected authentication response comprises temporarily disabling the power signal from the test device for a pre-specified time period that is finite;
- sending an authentication request signal to the test device;
- receiving, via an interface, an authentication response signal from the test device in response to the authentication request signal;
- comparing the authentication response signal with the expected authentication response in order to determine whether the test device is authentic or counterfeit; and
- successfully authenticating the test device as being authentic when the authentication response signal is similar to the expected authentication response when the authentication response signal indicates a lack of the power signal for the pre-specified time period.

19. The method of claim 18, further comprising performing a two-stage authentication test by testing if the test device can disable the power signal in response to the authentication request signal and testing if the test device can provide a correct cryptographic response in response to at least one cryptographic challenge.

20. A non-transitory computer readable medium comprising a plurality of instructions executable on a microprocessor of an electrical device that provides a power signal for adapting the microprocessor to implement a method of authenticating the electrical device by an authentication device, wherein the method comprises:
- enabling the power signal on a power line at an interface of the electrical device;
- receiving an authentication request signal at the interface from the authentication device;
- generating an authentication response signal comprising temporarily disabling the power signal on the power line for a pre-specified time period that is finite during authentication of the electrical device in response to the authentication request signal; and
- providing the authentication response signal on the power line whereby the electrical device is successfully authenticated upon the authentication device detecting a lack of the power signal for the pre-specified time period.

21. A non-transitory computer readable medium comprising a plurality of instructions executable on a microprocessor of an authentication device for adapting the microprocessor to implement a method of authenticating a test device that provides a power signal and is to be authenticated, wherein the method comprises:
- storing at least one expected authentication response in a memory of the authentication device, the at least one expected authentication response comprises temporarily disabling the power signal from the test device for a pre-specified time period that is finite;
- sending an authentication request signal to the test device;
- receiving, via an interface, an authentication response signal from the test device in response to the authentication request signal;
- comparing the authentication response signal with the expected authentication response in order to determine whether the test device is authentic or counterfeit; and
- successfully authenticating the test device as being authentic when the authentication response signal is similar to the expected authentication response when the authentication response signal indicates a lack of the power signal for the pre-specified time period.

* * * * *